United States Patent [19]
Medders, II

[11] Patent Number: 4,988,439
[45] Date of Patent: Jan. 29, 1991

[54] TWO STAGE TRAVELING BRIDGE FILTER

[75] Inventor: Carlton Medders, II, Thomasville, Ga.

[73] Assignee: Davis Water & Waste Industries, Inc., Thomasville, Ga.

[21] Appl. No.: 315,928

[22] Filed: Feb. 27, 1989

[51] Int. Cl.⁵ .................... B01D 24/18; B01D 24/46
[52] U.S. Cl. .................................. 210/264; 210/273; 210/274; 210/275; 210/292
[58] Field of Search ............... 210/108, 264, 273, 274, 210/275, 276, 279, 284, 292, 293, 527, 807, 271, 285

[56] References Cited

U.S. PATENT DOCUMENTS

| | | | |
|---|---|---|---|
| Re. 12,488 | 5/1906 | Blaisdell | 210/264 |
| 471,811 | 3/1892 | Deutsch | 210/264 |
| 649,409 | 5/1900 | Jewell | 210/264 |
| 1,383,384 | 7/1921 | Brown | 210/276 |
| 1,617,654 | 2/1927 | Sivade | 210/273 |
| 2,194,071 | 3/1940 | Hine | 210/275 |
| 2,217,689 | 10/1940 | Laughlin | 210/273 |
| 2,235,227 | 3/1941 | Lose, Jr. | 210/264 |
| 2,302,449 | 11/1942 | Laughlin | 210/271 |
| 2,302,450 | 11/1942 | Laughlin | 210/275 |
| 2,335,749 | 11/1943 | Fraser | 210/276 |
| 3,134,735 | 5/1964 | Greenleaf | 210/264 |
| 3,984,326 | 10/1976 | Bendel | 210/275 |
| 4,094,785 | 6/1978 | Booty | 210/527 |
| 4,115,266 | 9/1978 | Ohshima | 210/807 |
| 4,133,766 | 1/1979 | Adie | 210/275 |
| 4,152,265 | 5/1979 | Meyers | 210/276 |
| 4,211,656 | 7/1980 | Cochrane | 210/274 |
| 4,308,141 | 12/1981 | Clendenen | 210/276 |
| 4,450,077 | 5/1984 | Black et al. | 210/275 |
| 4,454,034 | 6/1984 | Astrom et al. | 210/275 |
| 4,486,307 | 12/1984 | Weiler | 210/275 |
| 4,540,487 | 9/1985 | Johnson et al. | 210/264 |
| 4,547,286 | 10/1985 | Hsiung | 210/279 |
| 4,608,181 | 8/1986 | Hsiung et al. | 210/274 |
| 4,624,783 | 11/1986 | Black et al. | 210/275 |
| 4,765,889 | 8/1988 | Grujanac | 210/276 |
| 4,859,330 | 8/1989 | Pauwels | 210/274 |

Primary Examiner—Richard V. Fisher
Assistant Examiner—Joseph Drodge
Attorney, Agent, or Firm—Nixon & Vanderhye

[57] ABSTRACT

A liquid filtration system is provided which includes a traveling bridge carriage mounting air scour and backwash means within a single hood structure for successively cleaning each of a plurality of roughing filter cells and polishing filter cells formed in a filtration tank. The air scour means includes an air scour inlet conduit for supplying air under pressure to each cell. The backwash means includes a backwash conduit for creating suction within each filter cell. The single hood structure is adapted to sealingly engage each of the roughing and polishing filter cells. For the roughing filter cells, only an air scour operation is carried out while, for the polishing filters, backwash is done.

20 Claims, 2 Drawing Sheets

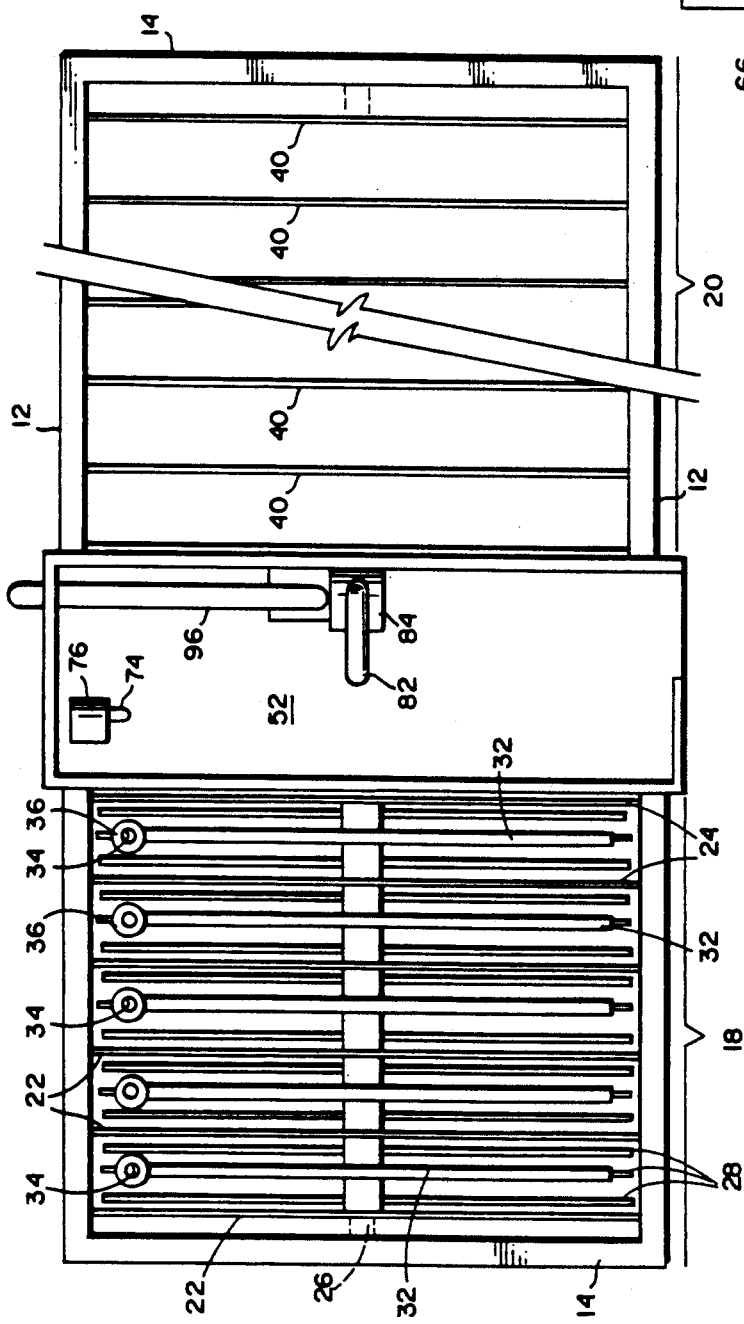
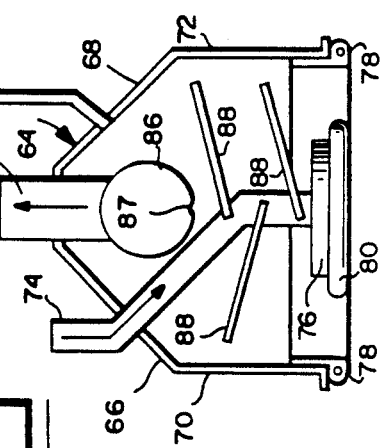
FIG.2
FIG.3

TWO STAGE TRAVELING BRIDGE FILTER

BACKGROUND AND SUMMARY OF THE INVENTION

This invention relates generally to liquid filtration systems and, more specifically, to traveling bridge-type cleaning apparatus for sequentially cleaning a plurality of suspended solids filter units, some of which are upflow filters and some of which are downflow filters.

It is well known in the art to utilize filtration tanks divided into a plurality of identical filter cells, one adjacent the other, and all containing a multi-layer arrangement of granular filter media such as sand, gravel and the like. In downward flow filtration systems of this type, water or other liquid containing suspended solid particles is introduced into the filtration tank from above and filtered water is drawn off from a chamber beneath the filter cells. During downward flow through the individual cells, particulate matter is entrapped within the layers of granular filter media. Eventually, the particulate matter clogs the filter media, thereby reducing the filtering capability of the system. Thus, there is a need for periodic cleaning of the filter cells. It is also known to maintain such units in continuous operation during cleaning by the use of traveling bridge devices which move from one filter cell to the next, to clean individual cells while permitting the filtration process to continue in the remaining cells.

Examples of traveling bridge apparatus of this type may be seen in U.S. Pat. Nos. 4,540,487; 4,486,307; 4,133,766; 3,984,326, 2,235,227, and 649, 409. Typically, traveling bridge systems include an overhead carriage, movable along tracks, guideways or the like, which carries, e.g., a backwash hood successively engageable with the upper end of each filter cell. For a downflow type filter, water or other treatment liquid is generally introduced into the cell from below, in a counterflow arrangement to the normal filtering direction. The backwash hood typically includes a suction head for drawing out fluid and debris forced to the surface of the filter cell as a result of the backwash. As the backwash of individual cells is completed, the carriage will index the backwash hood to the next adjacent cell. See, for example, U.S. Pat. No. 4,308,141, in which a modular filter system is disclosed, and wherein a traveling bridge type backwash system is indexed to successive filter units.

Other travelling bridge constructions for use in liquid filtration systems are disclosed in commonly owned U.S. Pat. No. 4,859,330 and Ser. No. 07/301,715 filed Jan. 26, 1989 and now allowed.

In the present invention, a unique combination of filter cell cleaning devices is provided in a traveling bridge configuration. Specifically, a single hood assembly is provided which includes both air scour means and backwash means for individual or combined simultaneous use, depending on the type of filter cells to be cleaned.

More specifically, the present invention is designed primarily for use with a tank containing a plurality of roughing filters followed by a plurality of polishing filters. Roughing filters are typically upflow filters designed to entrap larger or coarser particles, while polishing filters are typically downflow filters designed to entrap smaller or finer particles. The present invention, for the first time, permits both types of filters to be effectively cleaned by a single unit in a traveling bridge system.

In one exemplary embodiment, an elongated, rectangular filtration tank is divided into a roughing filter portion and a polishing filter portion. In both portions, the filter cells are defined by a plurality of laterally spaced, substantially parallel partitions extending across the entire width of the tank. The principal distinction between the roughing and polishing filter cells relate to depth of the cell and size of the media contained therein. Thus, the roughing cells are deeper, i.e., the cell bottom wall is located closer to the tank bottom wall, and the filter media comprises a single layer of gravel or anthracite in the 4 mm range. In the polishing filter portion of the tank, the depth of the polishing cells is less, i.e., the cell bottom wall is located farther away from the tank bottom wall, thereby creating a larger chamber between the cell and tank bottom wall. In addition, polishing filter media may include a multi-layer bed ranging from fine to coarse particles.

The tank is further provided with tracks or guideways supporting a traveling bridge for movement along the top of the tank, in a direction transverse to the orientation of the upright partitions. The traveling bridge includes a carriage which carries air scour means and backwash means within a single hood structure adapted for successive engagement with each filter cell. In this regard, the side walls of the hood are laterally spaced apart a distance corresponding to the space between the cell partitions walls, so that the hood may sealingly engage each of the cells in succession. In this regard, the hood is provided with sealing means, such as rubber gaskets, at the lower end of each of the vertical side walls thereof, which engage the upper surfaces of the cell partition walls, thereby isolating the cell from the remaining cells.

An air scour supply conduit extends between the interior of the hood and the carriage. The air scour supply conduit is connected at its upper end to a blower or other source of pressurized air mounted on the carriage. The lower end of the air scour supply conduit, located within the hood, is provided with a flanged head or boot adapted to successively engage vertical risers extending upwardly from the lower end of each roughing filter cell to the upper end thereof, approximately mid-way along the length of the cell. In this first exemplary embodiment, a horizontal air supply conduit is connected to the lower end of each vertical riser and extends across the lower half of each filter cell, preferably within the lower portion of the single layer of filter media, and in a direction substantially parallel to the cell partitions. Each such horizontal conduit is provided with a plurality of perforations along its length and about its periphery so that, when air is supplied to the filter cell via the air scour supply conduit, it will be uniformly discharged along the lower end of the cell, within the layer of filter media. As the air flows upwardly through the filter media, it dislodges particulate matter which will be removed during a simultaneous backwash. The air utilized in the air scour step is eventually vented to atmosphere, preferably by conduit means extending from the interior of the hood upwardly to a point above the level of water in the tank.

Also mounted within the single hood structure is a conventional backwashing device including a horizontal backwash suction conduit. The horizontal backwash suction conduit is located within an upper portion of the hood, above the air scour inlet, and is connected substantially midway along its length to a vertical suction conduit extending upwardly, through the hood, to the carriage. The carriage also mounts a suction pump, the outlet side being connected to the vertical suction conduit. Like the horizontal air supply conduits within the cells, the horizontal backwash conduit in the hood has a length substantially equal to the length of the individual cells. The suction conduit is also provided with a plurality of uniformly arranged apertures extending along its length and about its periphery to uniformly draw liquid and accompanying debris out of the filter cell, for example, in the opposite direction of normal filter flow in the polishing filters.

The hood is also provided with a plurality of inclined baffles extending substantially the length of the hood, and arranged to separate air and liquid within the hood so that the backwash suction conduit does not draw air from the air scour operation into the suction pump.

In use, the air scour and backwash means are operated simultaneously for cleaning the polishing filter cells, While only the air scour means are used to clean the roughing filter cells.

The combination of a simultaneous air scour/backwash operation, carried out successively for each polishing filter cell, and air scour operation for each polishing filter cell, quickly and effectively cleans all of the filter cells and filter cell media in the tank without disturbing the overall operation of the filtration system.

It will be appreciated that in order to index the hood assembly to successive cells along the filtration tank, the assembly is reciprocable vertically by a distance sufficient to enable the hood structure to disengage from the cell partitions or walls, and to clear the adjacent cell partitions during lateral movement to the next cell. To this end, a portion of each of the vertical air scour conduit and vertical backwash conduit, respectively, may be provided with a flexible, e.g., bellows-type, connector which permits a relatively small degree of vertical movement of the hood structure relative to the vertically fixed carriage.

In a related aspect of the invention, the vertical air scour riser provided in each roughing filter cell may be fitted with a spring loaded valve at its upper end, the valve opening in response to air pressure supplied through the air scour supply conduit when the riser and supply conduit are in engagement.

It is also a feature of this invention that the air scour supply conduit boot mount a squeeqee-type device to remove debris from the upper surface of the valve. In an alternative mode, the squeegee-type device may be eliminated and the air scour pump can be actuated just prior to engagement of the air supply conduit and the riser valve to supply a burst of air which will clean the valve head.

Accordingly, in its broadest aspect, the present invention relates to a traveling bridge filter cleaning system including a liquid filtration tank divided into a plurality of adjacent filter cells, a first group of which are roughing filters and a second group of which are polishing filters, each group of cells containing filter media appropriate for its purpose. A traveling bridge carriage is located above the tank and movable along the tank, the carriage mounting air scour means and backwash means within a single hood adapted to sealingly engage successive ones of the roughing and polishing cells.

It will therefore be appreciated that the present invention provides a unique combination of air scour and backwash means in a traveling bridge filter cleaning system which effectively cleans successive cells of a multi-function tank without disturbing the filtering process in the remaining cells.

Additional objects and advantages of the subject invention will become apparent from the detailed description which follows.

BRIEF DESCRIPTION OF THE DRAWINGS

FIG. 2 is a partially schematic top view of a filtration tank illustrated in FIG. 1; and FIG. 3 is an enlarged partial detail of the side view of the air scour and backwash hood structure shown in FIG. 1.

DETAILED DESCRIPTION OF THE DRAWINGS

Figure 1:
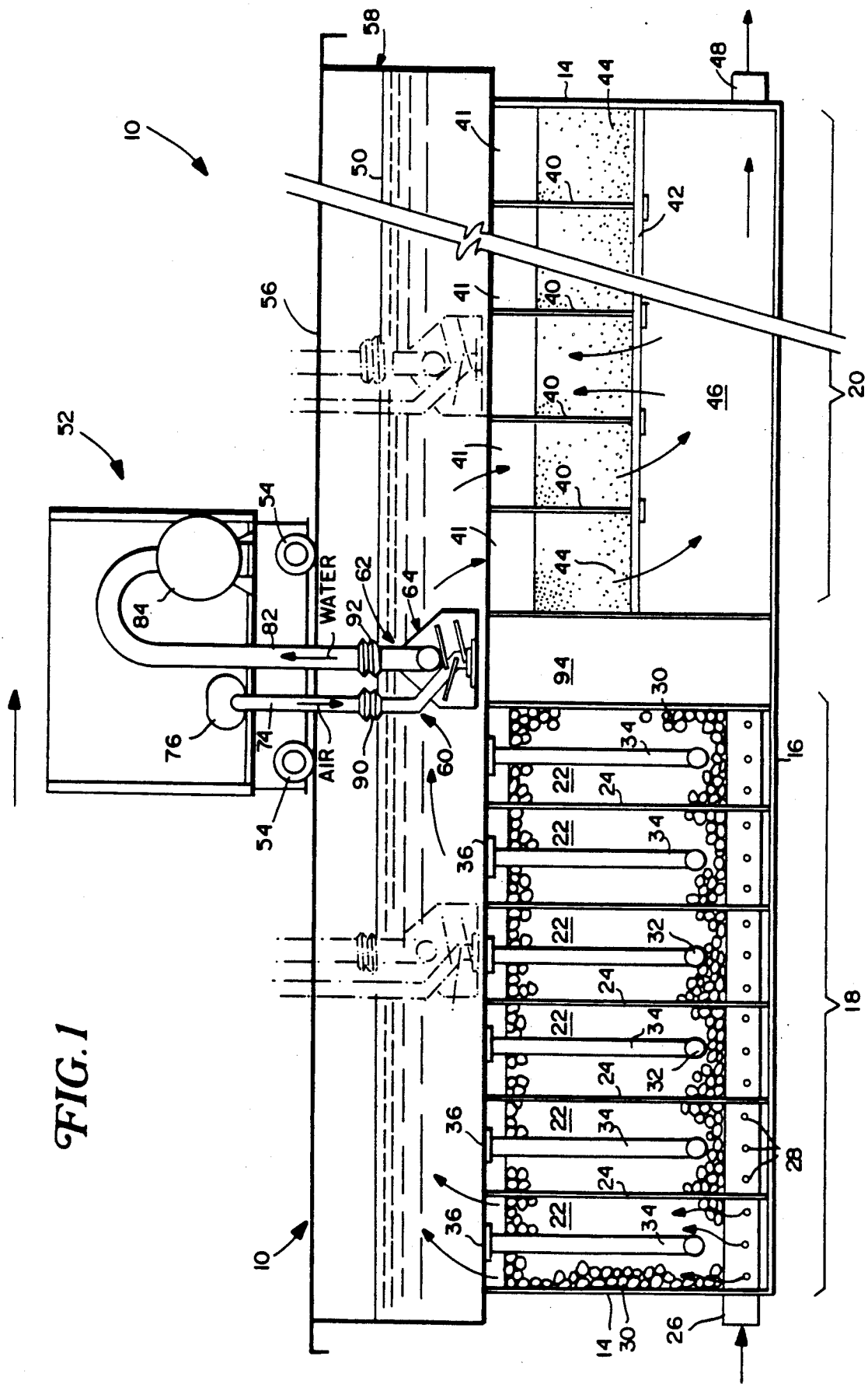
FIG. 1 is a partially schematic side view of a traveling bridge type filtration system in accordance with the invention.

Referring now to FIGS. 1 and 2, a suspended solids filtration apparatus in accordance with this invention includes a substantially rectangular tank 10 comprising side walls 12, end walls 14 and a bottom wall 16. The tank is divided into two sections, a roughing filter section indicated by numeral 18 and a polishing filter section indicated by numeral 20. The roughing filter section includes a plurality of adjacent filter cells 22 defined by vertically oriented partitions 24 which extend in parallel, across the width of the tank. The partitions 24 extend vertically from the bottom wall 16 of the tank upwardly to a termination point between about ⅓ to ⅔ the height of the tank side and end walls.

The roughing filter section receives influent through a horizontal inlet conduit 26 extending transversely of the filter cells and through the partitions 24 adjacent the bottom wall 16. From the inlet conduit 26 there extends lateral dosing headers 28 for each cell. Each header extends across substantially the entire width of the cell, as best seen in FIG. 2, and in parallel with the cell partitions 24. At the same time, each horizontal header 28 is formed with a plurality of apertures along its length for evenly distributing the influent within the respective cells. It will be appreciated that the apertures (not specifically shown but indicated by the upwardly directed arrows in FIG. 1) are oriented to direct the influent upwardly through the filter cell media 30.

The filter cell media 30 within the roughing filter section preferably comprises gravel or anthracite in the 4 mm range.

Each roughing filter cell is provided with a horizontally extending air inlet manifold or header 32 which extends generally parallel to, and adjacent partitions 24, and which extends substantially across the width of the tank above the headers 26. The manifold may be secured to the tank side walls 12 by mounting brackets or by other suitable means (not shown).

At a predetermined location along the length of the manifold or header 32, but preferably near one end thereof, there is connected a vertical riser 34 which extends upwardly to approximately the upper end of the cell partitions 24. Additional longitudinal bracing (not shown) may be employed between the vertical riser 34 and adjacent cell walls 24 if desired. Each riser 34 is provided with a flanged and preferably annular head or boot 36, the purpose of which will be described below.

The polishing filter section 20 of the tank also includes an underdrain or porous subfloor 42 which is supported by the partitions 40 thereby defining a plurality of polishing filter cells 41. The floor 42 supports a layer of filter media, preferably comprising sand 44, in each of the cells. The space between bottom wall 16 and subfloor 42 creates a chamber 46 from which filtered water is drawn by suitable drain or pump means (not shown) through an outlet 48. Under normal circumstances, the water or other fluid to be treated is supplied to the tank at a level above the filter media by any suitable means (not shown) and the tank is filled to a normal level 50.

In accordance with one exemplary embodiment of this invention, the air scour and backwash means are movably supported by a travelling bridge which includes a carriage 52 provided with a plurality of wheels 54 which are guided along tracks or guideways 56 on an upper extension 58 of the tank. It will be appreciated that the tracks or guideways may also be part of an overhead framework or the like, separate from the tank construction. Further, in this regard, it is to be noted that the carriage and controls for indexing the carriage are not part of this invention, and may be of any conventional construction.

The carriage 52 supports an air scour device 60 and a backwash device 62 in suspended relationship vis-a-vis the carriage. In accordance with an exemplary embodiment of the invention, both the air scour device and backwash device are mounted in a single hood 64, best seen in FIG. 3. The hood comprises elongated wall panels 66, 68 which include lower portions 70, 72 which are substantially vertically oriented and which are spaced apart by a distance substantially equal to the space between the upright partitions 24 and 40.

A substantially vertical air scour inlet conduit 74 extends downwardly from an air supply blower 76 mounted on the carriage 52, and is fixed within the hood by any suitable means.

The lower or outlet end of the conduit 74 is provided with a flanged boot 76 which is designed to sealingly engage, periodically, the flanged boots 36 associated with each of the risers 34 in the roughing filter cells.

The lower wall portions 70, 72 as well as boot 76 are provided along their lowermost surfaces with sealing means such as rubber gaskets 78, 80, respectively, which are secured thereto by any suitable means, enabling air and water tight seals to be established between the hood 64 and the individual filter cells 22, 41 as well as between the air scour inlet conduit 74 and the individual vertical risers 34.

The backwash device 62 includes a backwash suction conduit 82 extending from a suction pump 84 mounted on the carriage 52. The suction conduit 82 extends through the hood, approximately midway along the length of the hood, and is connected to a horizontal suction manifold 86 which extends generally parallel to the cell partitions 24, 40 and substantially across the entire width of the tank. The manifold 86 is also provided with a plurality of perforations (for example, see 87 in FIG. 3) which provide for substantially uniform suction within the hood 64 across the respective cells.

The hood 64 is also provided with a plurality of inclined baffle plates 88 which effectively separate air from the liquid and solids present within the hood 64, thereby preventing the backwash suction conduit from drawing air from the air scour device into the pump 84. More specifically, air is directed to the sides of the hood where it vents through one or more vent pipes 89 which extend upwardly above the liquid level 50.

It will be appreciated that in a cell cleaning operation, carriage 52 will successively index the air scour and backwash hood 64 to the roughing and polishing filter cells 22, 41, respectively, in the direction of the arrow in FIG. 1, and as shown in phantom in the same FIGURE. At the same time, means must be provided to move the hood 64 vertically toward the cells 22, 41. This movement is required to enable sealing engagement between the hood 64 and a respective cell, as well as sealing engagement between boots 36 and 76. After cleaning, the air scour and backwash hood must be retracted vertically upwardly away from the cell a relatively small distance, e.g., on the order of two inches, to provide the clearance necessary to permit horizontal indexing to the next cell. The vertical reciprocatory movement may be effected by any conventional means (not shown), such as hydraulic cylinders, jacks, etc., along with conventional controls.

In order to permit such relative vertical movement between the air scour and backwash hood 64 and carriage 52, flexible couplings 90, 92 are interposed in conduits 74, 82, respectively. The couplings may be in the nature of a bellows or any other suitable flexing means.

A dead space, or "dummy cell" 94 is provided between the roughing section 18 and polishing section 20 in order to provide a rest space or park position for the carriage 52 which does not interfere with any cell during operation of the apparatus, and which allows unrestricted access to each and every filter cell.

Alternatively, horizontal and vertical wall portions (not shown) may be employed to create extended tank areas at one or both ends of the tank to accommodate the traveling bridge carriage when not in use.

In operation, after the carriage has been moved to one end of the tank, i.e., to the far left in FIG. 1, the air scour and backwash hood 64 is lowered into position, such that the hood engages the partitions 24 of the first roughing filter cell 22, and conduit 74 sealing engages the corresponding riser 34. After the air scour stage is completed as to the first cell the hood assembly is retracted upwardly and moved laterally via carriage 52 to the next filter cell 22 and thereafter lowered into position so that the hood 64 engages the second roughing filter cell. Air scour operations are carried out in each filter cell 22, but because the influent is introduced under pressure from below each cell 22, backwash pumping in these cells is not necessary.

As the hood 64 is lowered into position over a subjacent filter cell, gaskets 78 on the hood walls 70, 72 establish a hydraulic seal with the cell partitions which isolates the cell from the remaining cells in the tank, thereby preventing debris from the cell being cleaned from moving into on or both of the adjacent cells. Similar seals are created at the interfaces of boots 36, 76, respectively.

After each of the roughing filter cells 22 has been air scoured, the carriage is indexed across the dummy cell 94 to the first of the polishing filter cells 41 where air scour and backwash functions may be carried out individually or simultaneously. For each of the polishing filters, backwash is carried out utilizing pump 84 to provide effective cleaning of each cell and the media contained therein. Upon completion of the cell cleaning process, the carriage 52 may be returned to its rest position above dummy cell 94 to permit unrestricted access (for routine maintenance, etc.) to all of the cells in the tank.

During air scour, blower 76 supplies air at about 4 to 6 psi, regulated by a check valve or other suitable means (not shown), to the horizontal manifold 32 via conduit 74, and riser 34. The air is discharged through the plurality of relatively small apertures in the manifold 32 for upward flow through the filter media 30. Suitable screening material may be used if desired to cover the perforations in the manifold 32 to prevent clogging of the perforations with dislodged debris, filter media, etc. The upward flow of influent and air dislodges particulate matter within the filter media and carries the matter toward the upper portion of the cell. Because the manifolds 32 are located above the inlet conduit 26, air scour within one cell may take place without disturbing the upward flow of liquid in adjacent roughing filter cells.

During backwash, suction is created in the horizontal 86 via pump 84, drawing water upwardly, countercurrent to the normal flow, through the filter media 44, hood 64, manifold 86 and backwash suction conduit 82, all the while cleansing the filter media and removing particulate matter initially dislodged in the air scour operation.

From pump 84, the backwash liquid is discharged through a hose or conduit 96 (FIG. 2) to a trough or drain (not shown) in a conventional manner. A valve arrangement may be incorporated into each of the vertical risers 34 for the principal purpose of preventing dirt and debris from entering the vertical risers. A mechanical squeegee-type blade may be used to clean off the top surface of the valve and/or boot structure just prior to engagement of the air scour boot 76 and vertical riser 34.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A traveling bridge filter cleaning system comprising a liquid filtration tank having a first portion with a plurality of adjacent up-flow roughening cells and a second aligned portion with a plurality of adjacent down-flow polishing filter cells, each of said cells containing filter media, a traveling bridge carriage located above said tank and movable along said tank, said carriage mounting air scour means and liquid backwash means within a single hood which is adapted to successively and sealingly engage each of said cells, said air scour means having an inlet conduit.

2. A traveling bridge filter cleaning system as defined in claim 1 wherein each of said roughing filter cells is provided with an air scour manifold extending along substantially the entire length of the roughing filter cell within a layer of filter media.

3. A traveling bridge filter system as defined in claim 2 wherein said air scour manifold includes at least one vertical riser adapted for sealing engagement with an air scour inlet conduit supported by said carriage.

4. A traveling bridge filter system as defined in claim 2 wherein said air scour manifold of each cell is located within said at least one layer of said filter media.

5. A traveling bridge as defined in claim 1 wherein each of said plurality of roughing cells and each of said plurality of polishing cells are defined by a pair of laterally spaced vertical partitions, and wherein said hood comprises a pair of side walls, having upper ends and lower ends, the lower ends of said sidewalls provided with sealing means for sealingly engaging successive pairs of said partitions in said tank.

6. A traveling bridge filter system as defined in claim 1 wherein each of said polishing filter cells is provided with at least one layer of filter media supported by a porous underdrain.

7. A traveling bridge as defined in claim 1 wherein said backwash means includes a suction manifold extending along substantially the entire length of said hood.

8. A traveling bridge as defined in claim 7 wherein said air scour means comprises an air scour blower for supplying air under pressure to each of said roughing filter cells, and a backwash pump for creating suction within each of said polishing filter cells.

9. A traveling bridge as defined in claim 8 wherein each of said roughing filter cells includes a substantially vertical riser connected to said suction manifold, and wherein said riser is adapted for sealing engagement with said air scour inlet conduit.

10. A water filtration system comprising a filtration tank divided into a plurality of adjacent roughing filter cells and a plurality of adjacent polishing filter cells, a traveling bridge filter cleaning system including a carriage carrying a single hood enclosing both air scour means and liquid backwash means, said hood adapted for individual successive engagement with each cell of said plurality of roughing cells and said plurality of polishing cells, and wherein said hood is provided with a plurality of baffles for separating air from liquids and solids within the hood, at least one of said baffles being inclined relative to other of said baffles.

11. The water filtration system according to claim 10 wherein all of said plurality of baffles are inclined relative to horizontal, for separating air and water within said hood.

12. The water filtration system according to claim 10 wherein the air scour means includes an air scour supply conduit, one end of which is located at a lowermost edge of the hood, and wherein the backwash means includes a suction manifold located in an upper portion of the hood.

13. The water filtration system according to claim 12 wherein said plurality of baffles are located between said air scour supply conduit and said suction manifold.

14. The water filtration system according to claim 12 wherein the suction manifold extends across substantially the entire width of said cells, and wherein a suction conduit extends between said manifold and a pump mounted on said carriage.

15. The water filtration system according to claim 14 wherein said air scour supply conduit extends between said hood and a blower mounted on said carriage.

16. A water filtration system including a traveling bridge cleaning apparatus having means for cleaning a plurality of adjacent roughing filter cells in one portion of a tank, and a plurality of adjacent polishing filter cells located in a second portion of the tank, said system comprising carriage means carrying a hood assembly enclosing air scour means and liquid backwash means; said hood assembly provided with sealing means adapted to establish, individually and successively, a substantially air and water tight seal between said hood and each of said cells,; said carriage being indexable horizontally to locate said hood assembly over each one of said cells in succession; and wherein each of said roughing filter cells is provided with conduit means engageable with said air scour means.

17. A traveling bridge filter system as defined in claim 16 wherein said conduit means is connected to a manifold extending across the cell, within a layer of filter media.

18. A water filtration system as defined in claim 17 wherein said tank is provided with a water inlet at a level below said manifold.

19. A water filtration system as defined in claim 16 wherein said first and second portions of said tank are separated by a dummy cell which serves as a park position for said carriage and hood assembly.

20. A water filtration system as defined in claim 16 wherein said roughing filters are up-flow filters and said polishing filters are down-flow filters.

* * * * *